United States Patent
Martin et al.

(10) Patent No.: US 12,332,971 B2
(45) Date of Patent: Jun. 17, 2025

(54) PROACTIVE SERVICE REQUESTS FOR FORECAST STORAGE SYSTEM FAILURES

(71) Applicant: Dell Products, L.P., Hopkinton, MA (US)

(72) Inventors: Owen Martin, Hopedale, MA (US); Ramesh Doddaiah, Westborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 525 days.

(21) Appl. No.: 17/965,164

(22) Filed: Oct. 13, 2022

(65) Prior Publication Data
US 2024/0126837 A1 Apr. 18, 2024

(51) Int. Cl.
*G06F 18/214* (2023.01)
*G06F 11/07* (2006.01)
*G06N 3/04* (2023.01)
*G06N 5/04* (2023.01)

(52) U.S. Cl.
CPC ........ *G06F 18/214* (2023.01); *G06F 11/0772* (2013.01); *G06N 3/04* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 6,230,313 B1 | 5/2001 | Callahan, II | |
| 11,562,168 B2 | 1/2023 | Balu | |
| 11,645,075 B1 * | 5/2023 | Wasserstrom | G06N 3/084 712/234 |
| 12,055,995 B2 * | 8/2024 | Viclizki | G06N 3/045 |
| 2007/0198445 A1 | 8/2007 | Zen | |
| 2011/0060707 A1 | 3/2011 | Suzuki | |
| 2011/0208849 A1 | 8/2011 | Barnett | |
| 2020/0080147 A1 | 3/2020 | Aberman | |
| 2020/0167137 A1 | 5/2020 | Geleji | |
| 2021/0034450 A1 * | 2/2021 | Vishwakarma | G06F 3/0689 |
| 2022/0156334 A1 | 5/2022 | De Paolis | |
| 2024/0036999 A1 * | 2/2024 | Aurongzeb | G06F 9/5055 |

* cited by examiner

*Primary Examiner* — Dov Popovici
(74) *Attorney, Agent, or Firm* — Anderson Gorecki LLP

(57) ABSTRACT

Streaming machine telemetry (SMT) event counters are placed in critical code paths of software executing on a storage system. Each monitoring interval the values of the SMT counters are reported. When a critical error occurs on the storage system, a time series set of SMT counters from a set of previous monitoring intervals is labeled with the error type and used as a training example for a learning process. The learning process is trained to learn to learn recursions between time series sets of SMT counter values and labeled error types. Once trained, a checkpoint of the learning model is deployed as an inference model and used to predict the likely occurrence of errors before the errors occur. Predicted errors are logged into a proactive service request queue, and feedback related to the predicted errors are used as feedback to continue training the learning process.

20 Claims, 9 Drawing Sheets

Error Matrix 280

Masked Error Matrix (based on severity of error)

PROACTIVE SERVICE REQUESTS FOR FORECAST STORAGE SYSTEM FAILURES

FIELD

This disclosure relates to computing systems and related devices and methods, and, more particularly, to a method and apparatus for forecasting storage system failures and generating proactive service requests.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Storage systems are complicated computer systems that may have hundreds of applications concurrently executing to implement particular storage operations in connection with storing and protecting customer data. These complicated systems occasionally encounter execution errors, which require resolution to restore the storage system to a correct operational state. To facilitate resolution of issues that are detected on the storage system, in some embodiments the storage system includes a notification system configured to notify customer support that a failure has occurred. This enables a dedicated team of professional customer support personnel, who are trained to work on the storage system, to be notified of failures and to take corrective action to restore operation of the storage system.

One example failure notification system is referred to herein as a "Dial-Home" system. When a failure occurs, a "dial-home" message is generated by the storage system that identifies the type of failure, the time of failure, and other relevant information. In some embodiments, a dial-home system on the storage system detects errors or failures in certain workflows or activities, and sends dial-home messages to the support team for review and recovery.

Dial-home events come at a cost to the company that is providing the support services, and also impact the customer experience. Specifically, some dial-home events can cause particular aspects of the storage system to be disabled until resolved, which can affect the customer's use of the storage system.

According to some embodiments, a method and apparatus for forecasting storage system failures and generating proactive service requests is provided. In some embodiments, streaming machine telemetry (SMT) event counters are placed in critical code paths by developers that are experts in maintaining, updating, and creating software designed to execute on the storage system. The key code paths might be code that is caused to execute during normal operation, as well as in code paths that are configured to be executed in connection with events that are associated with particular types of failures, for example, such as retry paths etc. In some embodiments, a single IO request will stream a variety of events (or counters) as the IO request progresses through the storage system. Similarly, failures, retry operations, automated error correction events, and numerous other actions on the storage system will cause SMT event counters to be incremented.

In some embodiments, a time series deep learning model is trained to learn when time series SMT counter values correspond to particular types of errors. In some embodiments the time series deep learning model is a long short-term memory implementation of a recurrent neural network that processes sequences of SMT data to classify, process and make predictions based on time series data. In some embodiments, the time series deep learning model is trained to learn when time series SMT data correlates with a set of more severe errors on the storage system.

Once the learning model has been trained to learn a recursion between time series SMT data and error types, a checkpoint of the learning model is deployed and used as an inference model to predict the likely occurrence of errors before the errors occur. Time series SMT data is provided to the inference model to enable the inference model to be used to predict the likelihood of errors occurring before the errors occur. Predicted errors are logged into a proactive service request queue, which are then evaluated by customer service representatives. Since the customer service representatives are able to be alerted to a potential impending error before the error occurs, proactive service can be implemented on the storage system to take corrective action to avert occurrence of the impending error. In some embodiments, SMT data continues to be applied to the learning model to continue refining the learning model, and as the predicted errors are processed, the customer service representatives provide feedback to the training model to label the time series SMT data that resulted in creation of the proactive service request.

By enabling errors to be predicted in advance based on SMT data, and enabling proactive service to be implemented on the storage systems by customer service representatives before the errors occur, it is possible to increase the reliability of the storage system and reduce downtime associated with resolving errors after they occur.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
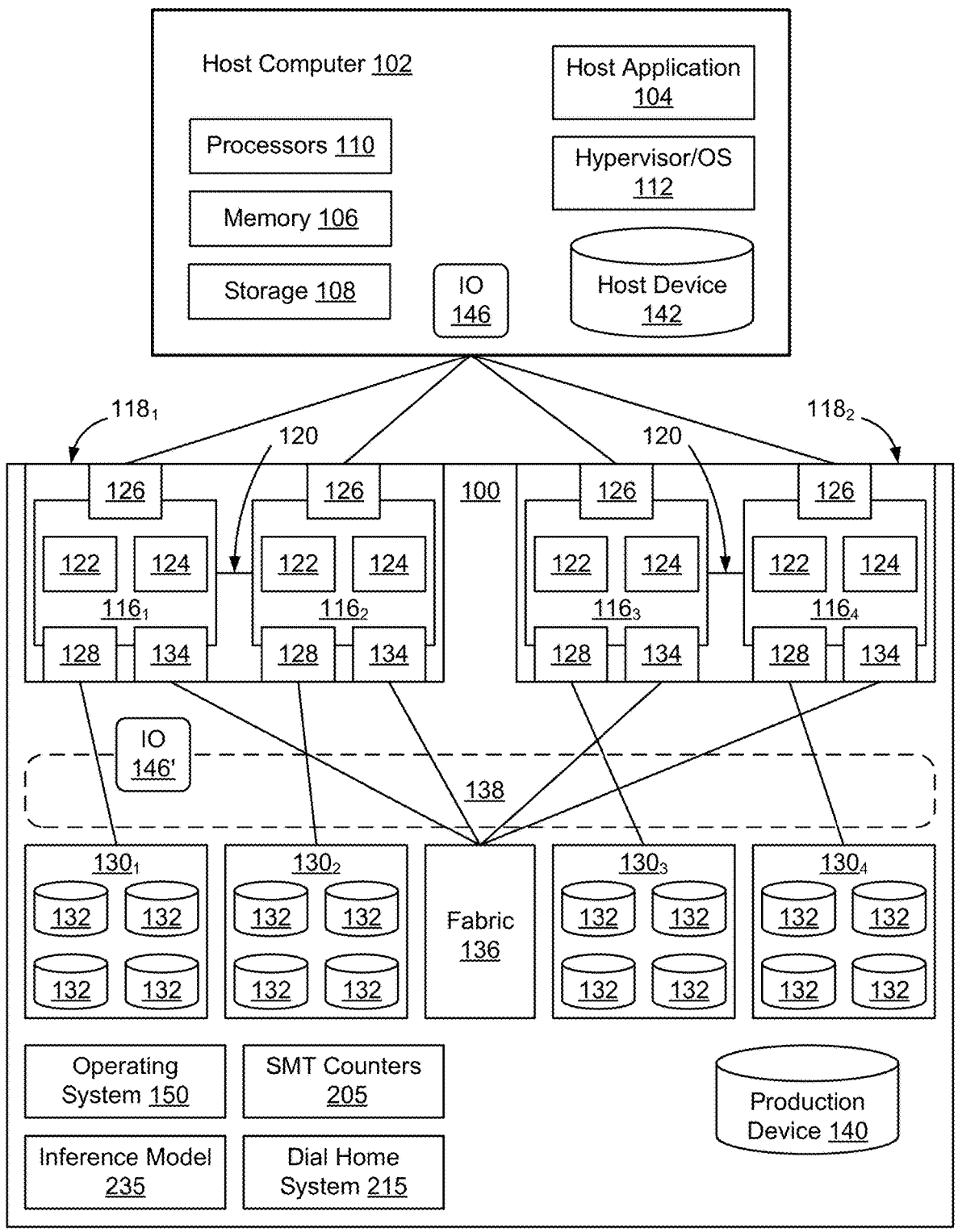
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes 116$_1$-116$_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes 116$_1$-116$_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Storage systems are complicated computer systems that may have hundreds of applications concurrently executing to implement particular storage operations in connection with storing and protecting customer data. These complicated systems occasionally encounter execution errors, which require resolution to restore the storage system to a correct operational state. To facilitate resolution of issues that are detected on the storage system, in some embodiments the storage system includes a notification system configured to notify customer support that a failure has occurred. This enables a dedicated team of professional customer support personnel, who are trained to work on the storage system, to be notified of failures and to take corrective action to restore operation of the storage system.

One example failure notification system is referred to herein as a "Dial-Home" system 215. When a failure occurs, a "dial-home" message is generated by the storage system that identifies the type of failure, the time of failure, and other relevant information. In some embodiments, a dial-home system 215 on the storage system 100 detects errors or failures in certain workflows or activities, and sends dial-home messages to the support team for review and recovery.

Dial-home events come at a cost to the company that is providing the support services, and also impact the customer experience. Specifically, some dial-home events can cause particular aspects of the storage system to be disabled until resolved, which can affect the customer's use of the storage system.

According to some embodiments, a method and apparatus for forecasting storage system failures and generating proactive service requests is provided. In some embodiments, streaming machine telemetry (SMT) event counters are placed in critical code paths by developers that are experts in maintaining, updating, and creating software designed to execute on the storage system. The key code paths might be code that is caused to execute during normal operation, as well as in code paths that are configured to be executed in connection with events that are associated with particular types of failures, for example, such as retry paths etc. In some embodiments, a single IO request will stream a variety of events (or counters) as the IO request progresses through the storage system. Similarly, failures, retry operations, automated error correction events, and numerous other actions on the storage system will cause SMT event counters to be incremented.

In some embodiments, a time series deep learning model is trained to learn when time series SMT counter values correspond to particular types of errors. In some embodiments the time series deep learning model 270 is a long short-term memory implementation of a recurrent neural network that processes sequences of SMT data to classify, process and make predictions based on time series data. In some embodiments, the time series deep learning model 270 is trained to learn when time series SMT data correlates with a set of more severe errors on the storage system.

Once the learning model has been trained to learn a recursion between time series SMT data and error types, a checkpoint of the learning model 270 is deployed and used as an inference model 235 to predict the likely occurrence of errors before the errors occur. Real-time, time series SMT data from a storage system is provided to the inference model 235 to enable the inference model 235 to be used to predict the likelihood of errors occurring on the storage system before the errors occur. Predicted errors are sent to the dial-home system 215 which causes the predicted errors to be forwarded to the customer service system 220. The predicted errors are logged into a proactive service request queue 240, to enable the predicted errors to be evaluated by customer service representatives. Since the customer service representatives are able to be alerted to a potential impending error before the error occurs, proactive service can be implemented on the storage system 100 to take corrective action to avert occurrence of the impending error. In some embodiments, SMT data continues to be applied to the learning model to continue refining the learning model, and as the predicted errors are processed out of the proactive service request queue 240, the customer service representatives provide feedback to the training model to label the time series SMT data that resulted in creation of the proactive service request.

By enabling errors to be predicted in advance based on SMT data, and enabling proactive service to be implemented on the storage systems by customer service representatives before the errors occur, it is possible to increase the reliability of the storage system and reduce downtime associated with resolving errors after they occur.

Figure 2:
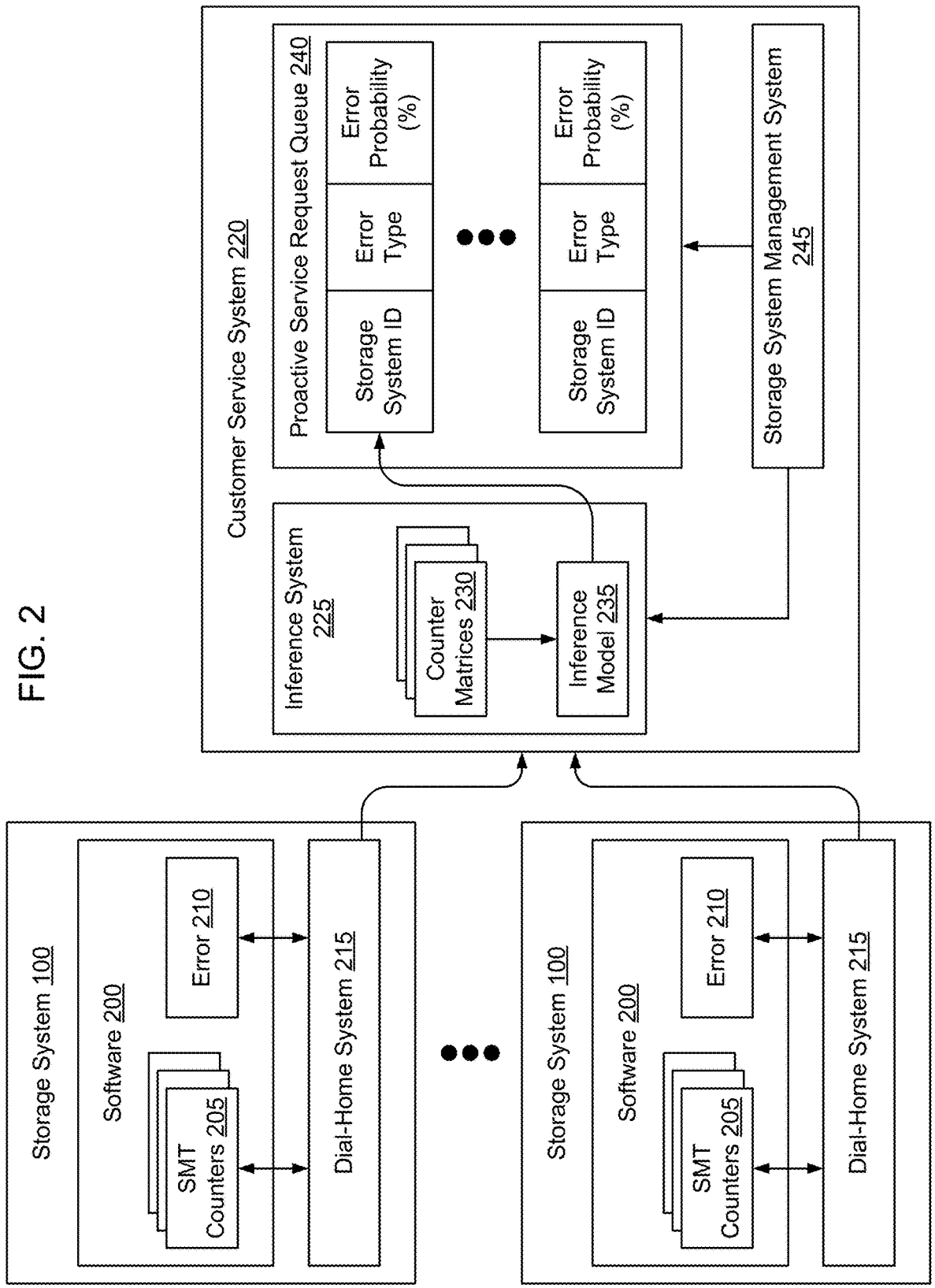
FIG. 2 is a functional block diagram of a set of storage systems connected to a customer service system, according to some embodiments.

FIG. 2 is a functional block diagram of a set of storage systems connected to a customer service system, according to some embodiments. As shown in FIG. 2, in some embodiments, a set of storage systems 100 include software 200 executing thereon. Streaming Machine Telemetry (SMT) event counters 205 are included in the software 200 to collect time series SMT data. In some embodiments, the SMT counters 205 are implemented using instructions to increment a particular counter value every time the software branch including the SMT counter is executed. Software often is implemented as a sequence of instructions that occur in a predefined order. Depending on the values of particular variables, and other environmental parameters, execution of the software may branch, to cause different sets of instructions to be executed. For example, one software branch (set of software instructions) may be used to implement a first function, and a second software branch may be used to implement a second function. SMT counters, in some embodiments, are implemented as instructions embedded within the sequences of operational instructions of the software, e.g., on feature branches of the software and at critical points in the code. When the software executes a sequence of operations that includes a particular SMT counter, the execution of that sequence of operations will cause the value particular SMT counter to be incremented. By reading the values of the SMT counters, it accordingly is possible to determine what branches of the software were executing during a preceding time interval. When SMT counters associated with branches of the software associated with trying to recover from error are rapidly increasing, it is possible to determine, for example, that it is possible that the software is experiencing particular conditions that probabilistically are likely to result in occurrence of an error.

In some embodiments, the values of a set of SMT event counters is periodically reported. There may be thousands of SMT counters depending on the implementation. In some embodiments, the SMT event counter values are all reset to zero after the SMT event counter values are reported. In some embodiments, the SMT event counter values continue to increase over time and are not reset each time the SMT event counter values are reported.

Errors 210 occasionally are detected, and are reported by the dial-home system 215. The dial-home system 215 communicates the errors 210 to a customer service system 220. According to some embodiments, when an error 210 occurs that is of the type that the learning process is intended to predict, the time series SMT counter values from a preceding set of monitoring intervals (counter matrices 230) are labeled with the error type, to create a labeled training example that is used to train a machine learning model 270. In some embodiments, the machine learning model is trained to learn a recursion between the time series of SMT counter values as the independent variables and the error label as a dependent variable. Once the learning model 270 is trained, a checkpoint of the trained machine learning model 270 is deployed and used as an inference model 235 to monitor the current time-series SMT counter values being generated by a storage system 100, to predict the likelihood of occurrence of a future errors of the storage system 100 based on current time series SMT counter values of the storage system.

In some embodiments, feature engineering is not implemented on the time series SMT counter values in connection with creating the training examples. Rather, it would be expected that particular types of failures would be associated with particular software operations. Causing execution of a particular software branch will cause the SMT counters associated with that software branch to increase prior to occurrence of the failure. By causing multiple instances of labeled time series SMT data to be provided to the learning model, the learning model can be trained to both identify a subset of the SMT counters as exhibiting an increase in value whenever a particular error occurs, and to learn that a time series of SMT counter values that shows an increase in those particular counters is likely to result in occurrence of that type of error.

Figure 3:
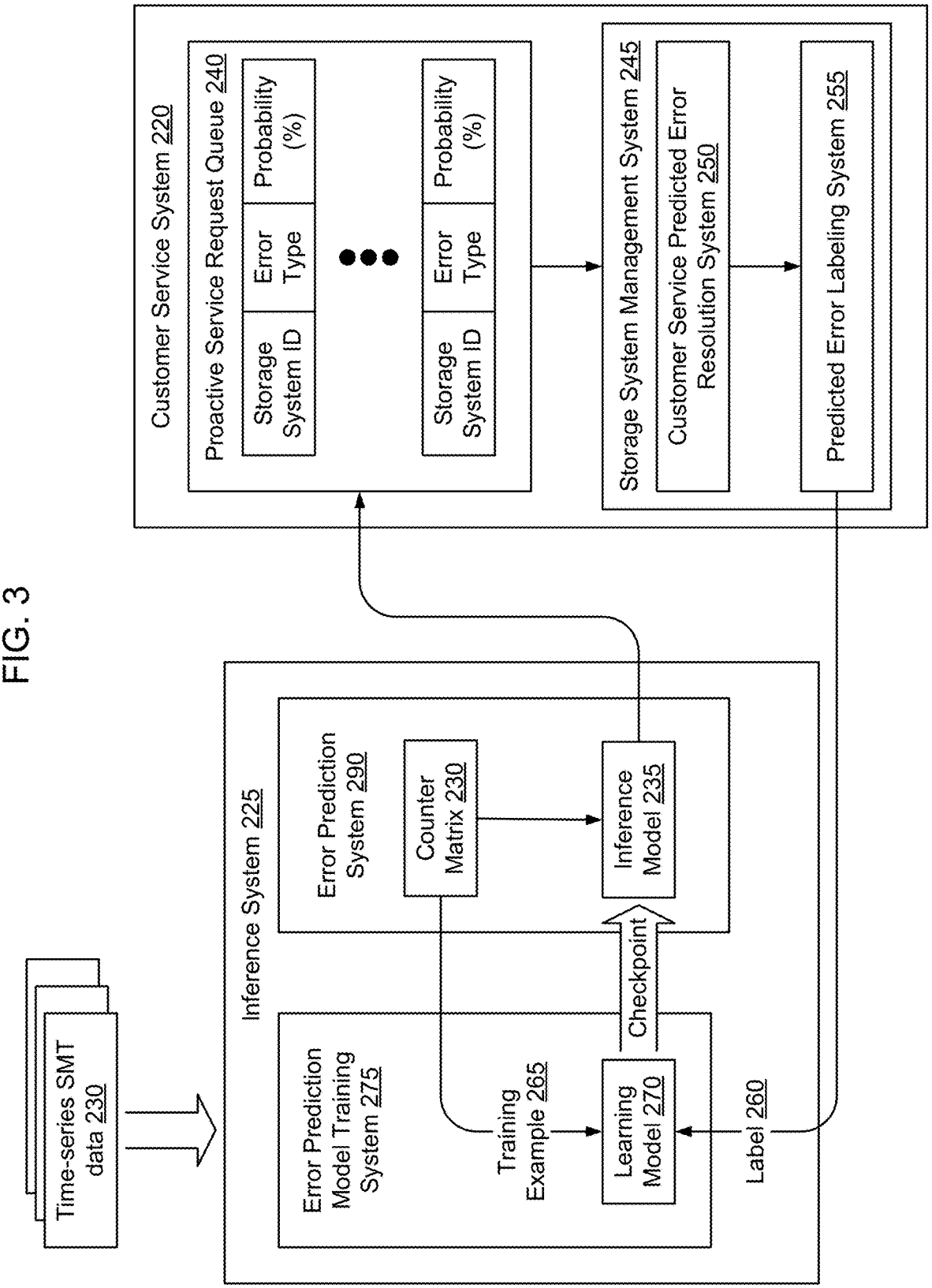
FIG. 3 is a functional block diagram of an example customer service system coupled to an inference system configured to forecast storage system failures and generate proactive service requests, according to some embodiments.

FIG. 3 is a functional block diagram of an example customer service system 220 coupled to an inference system 225 configured to forecast storage system failures and generate proactive service requests, according to some embodiments. As shown in FIG. 3, in some embodiments the inference system 225 includes an error prediction model training system 275 and an error prediction system 290. Labeled training examples formed from labeled time series SMT data 230 is input to the error prediction training system 275 and used to train a learning model 270 to learn a recursion between time series SMT data and the occurrence of errors 210. Once the learning model 270 is sufficiently trained, a checkpoint of the learning model 270 is deployed to the error prediction system 290 and used as an inference model 235 to analyze current time series SMT data generated by software 210 executing on a storage system 100. As shown in FIG. 1, in some embodiments the inference model 235 is locally deployed in each storage system that is to be monitored, to enable the inference model to locally generate proactive service requests that are sent back to the customer service system 220 using dial-home system 215. However, in some embodiments one or more instances of the inference model are deployed at the customer service system and the time series SMT data from the set of storage systems to be monitored is sent to the customer service system and locally processed at the customer service system using the one or more instances of the inference model 235.

When the inference model 235 recognizes a pattern in the current time series SMT data generated by the executing software running on a storage system 100, the inference model generates a proactive service request that is sent to the customer service system 220 and added to a proactive service request queue 240. In some embodiments, each proactive service request includes information such as the storage system ID of the storage system where the proactive service request originated, the error type, and an error probability associated with the predicted error.

A customer service representative uses an application such as a storage system management system 245 to select proactive service requests from the proactive service request queue 240 into a customer service predicted error resolution system 250. The customer service representative handles the proactive customer service request in a normal manager, such as by performing diagnostic operations on the storage system 100, taking corrective action on the storage system, or otherwise interacting with the storage system 100 to proactively fix the storage system in an attempt to prevent the predicted error from occurring.

In some embodiments, the storage system management system 245 includes a feedback system (predicted error labeling system 255) that the customer service representative can use to label the proactive service request as being related to a real issue with a workaround, a real issue that needed escalation, a false positive with no issue found, a false positive with an issue found that was non-critical, or using another classification. The feedback from the customer service agent via the predicted error labeling system 255, in some embodiments, is combined with the time series SMT data that led to generation of the proactive service request queue, and used to provide an additional labeled training example that is provided to the learning model 270 to continue training of the learning model 270. Periodically, as the learning model 270 continues to be trained, new checkpoints of the learning model 270 are created and used to update the inference model 235.

Figure 4:
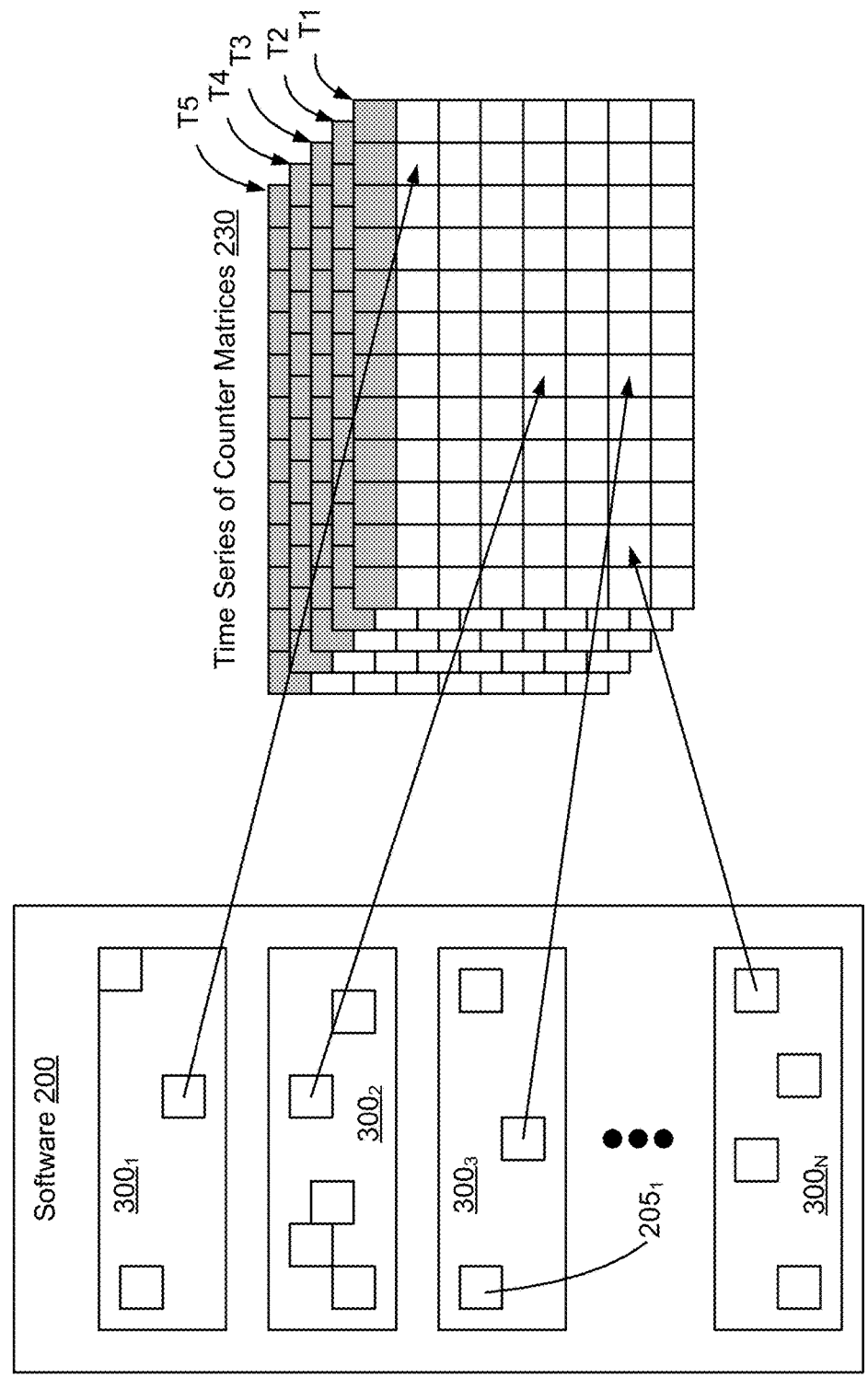
FIG. 4 is a functional block diagram of an example set of software applications, each of which includes a set of event counters placed in critical code paths, and showing an example mapping between the event counters and a counter matrix, according to some embodiments.

FIG. 4 is a functional block diagram of an example set of software applications, each of which includes a set of streaming machine telemetry (SMT) event counters 205 placed in critical code paths, and showing an example mapping between the event counters and a counter matrix 230, according to some embodiments. Specifically, as shown in FIG. 4, in some embodiments software 200 may include multiple branches $300_1$, $300_2$, $300_3$, ... $300_N$, that are configured to perform different functions. As the software executes, for example to process an IO operation, the sets of instructions of the branch will execute and, each time a SMT event counter 205 is encountered, the particular SMT event counter 205 will be incremented. By looking at the SMT event counters 205, it is possible to determine how often the particular branch of the software code was executed in a preceding monitoring interval. For example, when the counter labeled $205_1$ in FIG. 4 increases from 10 to 15 during a particular monitoring interval, it is possible to infer that the portion of the branch $300_3$ where the SMT counter $205_1$ is located was executed five times during the monitoring interval.

As shown in FIG. 4, in some embodiments each SMT counter is included in a counter matrix 230. Periodically, all SMT counter values are read to create an instance of the SMT counter matrix. A set of subsequent SMT counter matrices forms a time series of counter matrices 230. The time series of counter matrices shows the manner in which the SMT counter values have increased over time. For example, in FIG. 4, the time series of counter matrices 230 is shown as including five SMT counter matrices taken at time=T1, time=T2, time=T3, time=T4, and time=T5. It should be understood that although FIG. 4 shows a time series that includes 5 consecutive SMT counter matrices, that the other numbers of counter matrices can be used to implement a SMT time series depending on the implementation. In some embodiments, the software is allowed to run for a period of time referred to herein as a monitoring interval and, at the end of the monitoring interval, the value of each SMT event counter 205 is added to the SMT counter matrix to create an instantaneous SMT counter matrix. The set of instantaneous SMT counter matrices that are created during a set of subsequent monitoring intervals forms the time-series of counter matrices.

In some instances, software errors cause particular branches of the code to execute, which will be associated with a sharp increase in a small subset of SMT counters, that can be determined from the time series set of counter matrices 230. For example, a particular software application might have a software branch 300 or a set of software branches that are executed in connection with failures, retries, automated error correction, or in connection with other events. Any SMT counters on these branches will indicate that one of these events has occurred. Accordingly, when an error 210 occurs, time series of counter matrices 230 preceding the error 210 are labeled with the error type, and provided to the learning model 270. The learning model identifies a subset of the counters that exhibited an upward trend prior to occurrence of the error from the time series counter matrices and learns an association between the SMT counters that exhibited an upward trend in the time series counter matrices and the error type. As additional training examples are generated, for example by labeling other time series of counter matrices with the same error 210, the association learned by the learning model 270 is either reinforced (in instances where the time series shows a similar marked increase in the particular set of SMT event counters) or is diminished (in instances where the time series does not show a similar marked increase in the particular SMT event counters). In this way, the learning process 270 is able to identify a small number of relevant counters as well as the time series patterns exhibited by the relevant counters that is determined to be indicative of an impending failure of a particular type.

Figure 5:
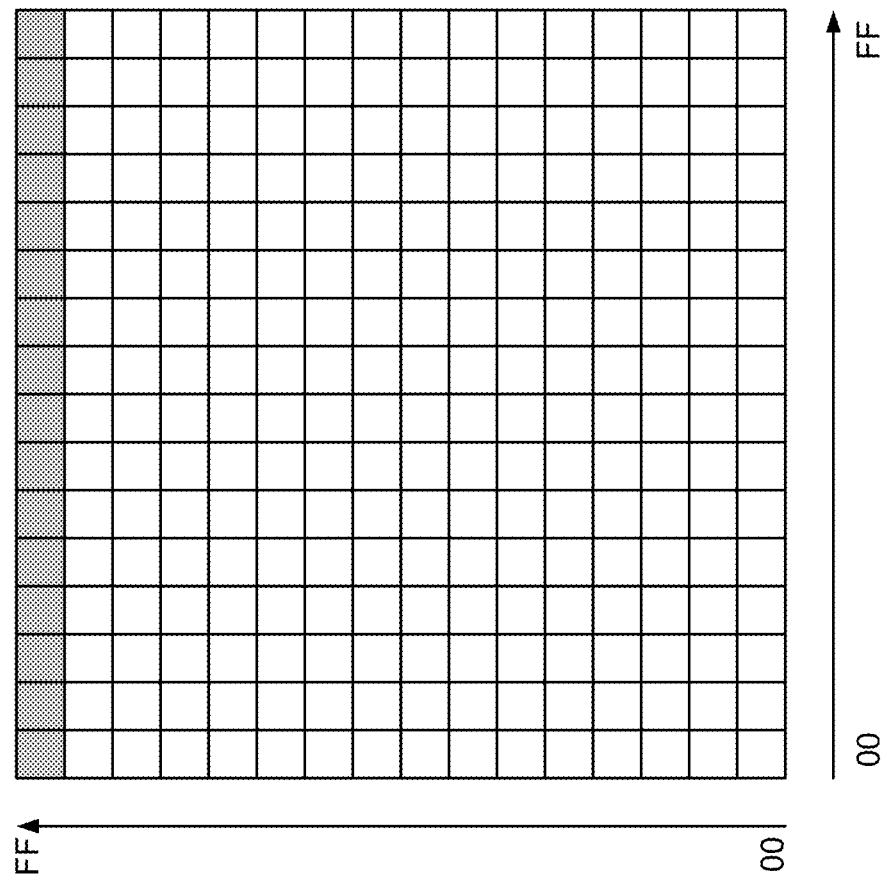
FIG. 5 is a functional block diagram of an example error matrix, according to some embodiments.

FIG. 5 is a functional block diagram of an example error matrix 280, according to some embodiments. As shown in FIG. 5, in some embodiments, all possible fatal errors are presented in an error matrix. In the example error matrix 280 shown in FIG. 5, the matrix size is 256×256, but other sized error matrices may be used. The goal of the inference system is to predict which of the errors in the error matrix are likely to occur, given the current time series SMT counter matrices.

Figure 6:
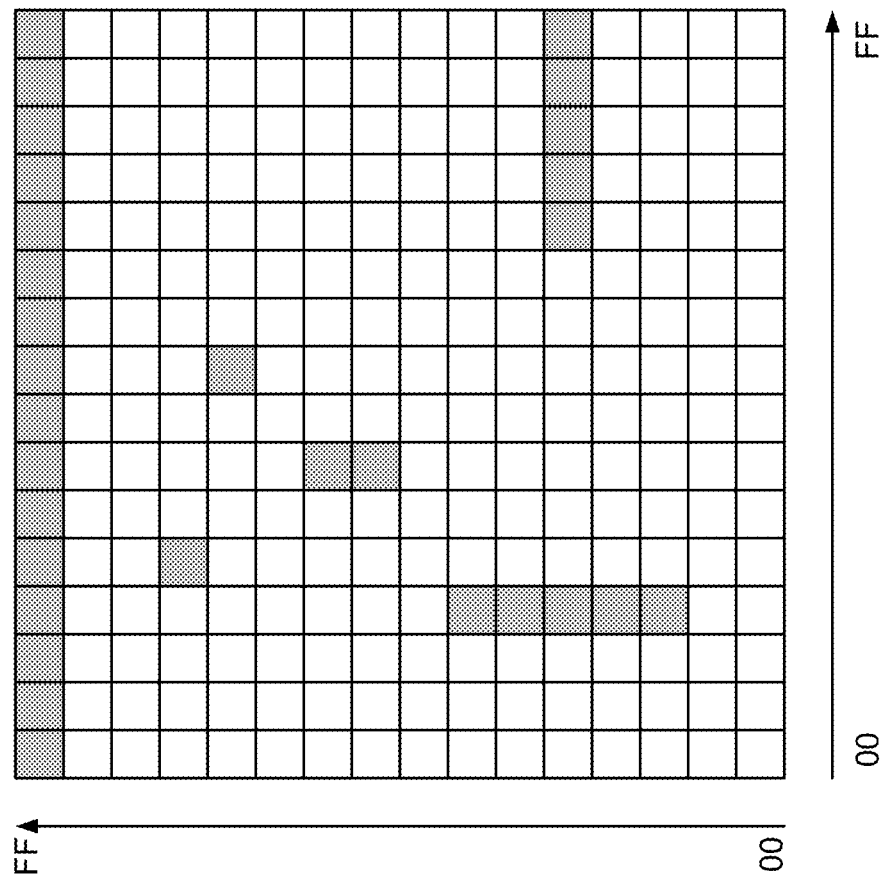
FIG. 6 is a functional block diagram of an example masked error matrix, in which a subset of all errors deemed to be most important (severe) have been masked and are to be used to train a learning model, according to some embodiments.

FIG. 6 is a functional block diagram of an example masked error matrix, in which a subset of all errors deemed to be most important (severe) have been masked and are to be used to train a learning model, according to some embodiments. In some embodiments, the learning model 270 is only trained to learn an association between time series sets of counter matrices and a subset of the errors of the error matrix 280 that are deemed to have a higher severity. In some embodiments, a subject matter expert creates a mask of error conditions to train the learning model, such that training examples are only created when the type of error 210 corresponds with one of the masked error types. For example, the masked error matrix may be used to identify all errors with a severity level of 1 (highest severity) and select lower-level errors. By not training the learning model 270 based on all of the errors of the error matrix 280, it is possible to reduce the amount of training required to achieve convergence. Additionally, since the trained learning model will be used to create a checkpoint that is used as an inference model, not having the inference model trained to look for lower-level errors enables the errors that are predicted and placed in the proactive service request queue to be associated with only the most significant types of errors on the storage system.

Figure 7:
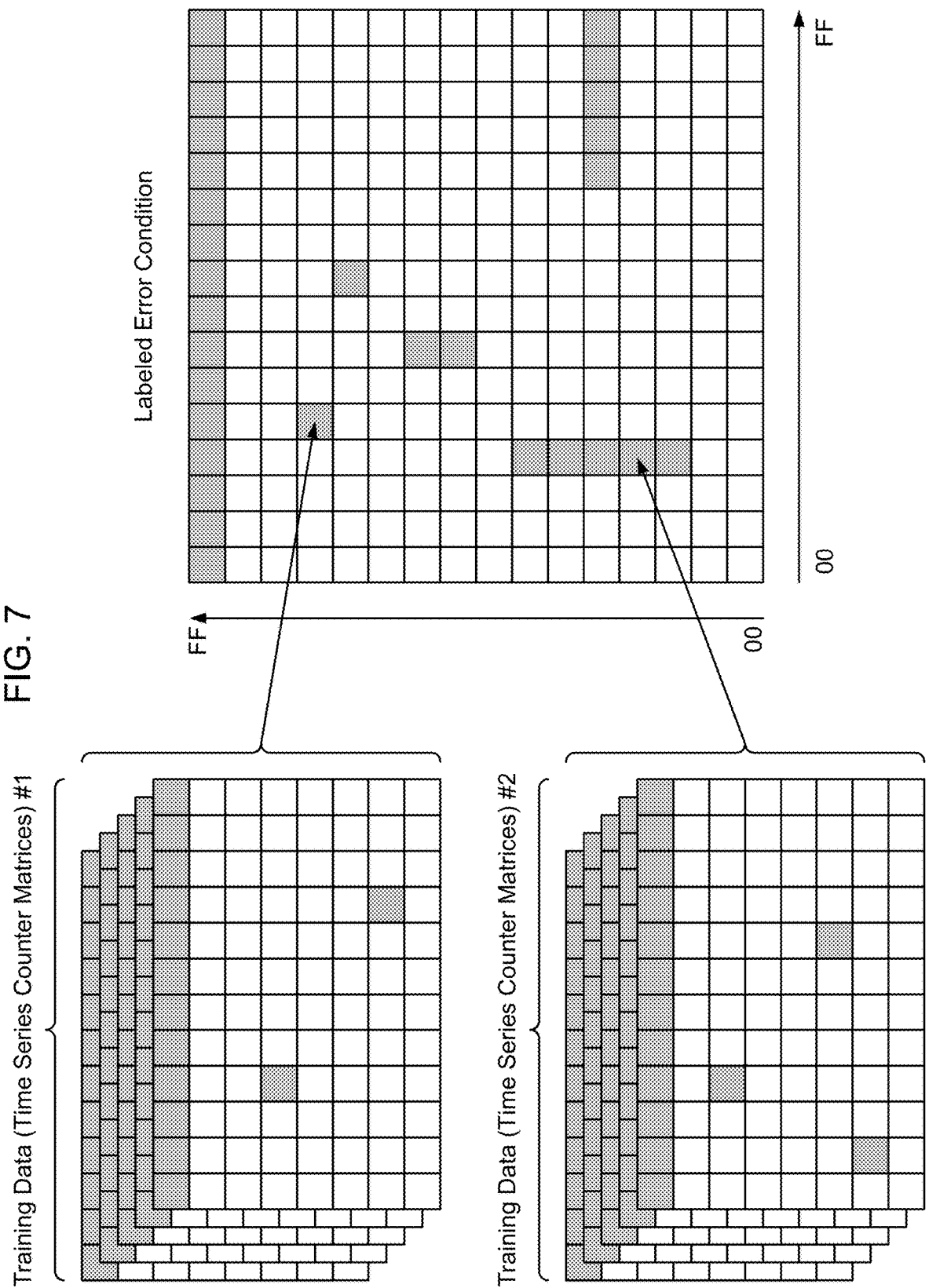
FIG. 7 is a functional block diagram showing a set of training examples, each training example including a time series set of counter matrices that are labeled based on the subsequent occurrence of one of the masked errors, according to some embodiments.

FIG. 7 is a functional block diagram showing a set of training examples, each training example including a time series set of counter matrices that are labeled based on the subsequent occurrence of one of the masked errors, according to some embodiments. As shown in FIG. 7, by masking the error matrix to identify a subset of error conditions that should be used to generate training examples that are used to train the learning model, any time an error occurs that is associated with one of the masked errors, the time series set of counter matrices that preceded the error are obtained from the storage system 100, labeled using the error type, and used as a training example 265 to train the learning model 270.

Figure 8:
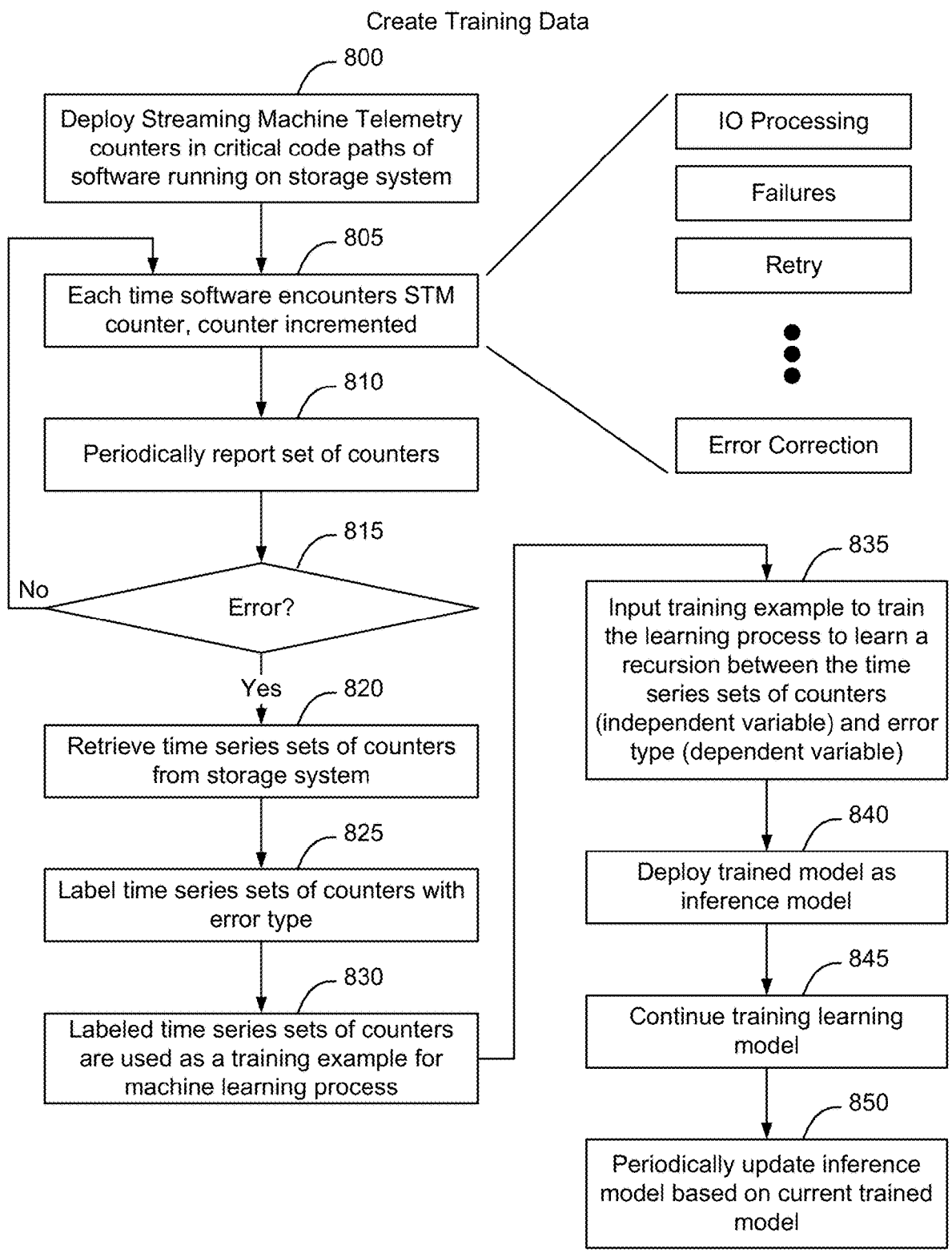
FIG. 8 is flow chart of an example process of creating training examples to be used to train a learning model to forecast storage system failures and generate proactive service requests, according to some embodiments.

FIG. 8 is flow chart of an example process of creating training examples to be used to train a learning model 270 to forecast storage system failures and generate proactive service requests, according to some embodiments. As shown in FIG. 8, in some embodiments streaming machine telemetry counters are deployed in critical code paths of software running on a storage system (block 800). A streaming telemetry counter may be implemented, for example, as an instruction embedded within the code path to increment counter having a respective counter ID, e.g.:

SMT_Counter_ID12345=SMT_Counter_ID12345+1.

Other forms of SMT counters may be used as well, depending on the implementation.

Each time the software encounters a SMT counter, it increments the counter (block 805). Example SMT counters may be associated with multiple aspects of software execution, including for example, IO processing, failures, retries, error correction operations, and multiple other aspects of the software execution. Periodically, the set of SMT counter values is reported (block 810). In some embodiments the SMT counters are reported hourly, although the frequency with which SMT counters are reported will depend on the implementation. When the SMT counters are reported, they are saved as an instance of a SMT counter matrix.

A determination is then made if an error has occurred (block 815). As described above in connection with FIG. 6, in some embodiments not all errors are used to create training examples. Accordingly, in block 815, in some embodiments a determination is made if a masked error has occurred (block 815). When no error occurs, or when an error occurs that is not included in the masked error matrix (a determination of NO at block 815) the process returns to block 805 to continue collecting SMT counters.

When a determination is made that a masked error has occurred (a determination of YES at block 815), a time series set of counters matrices is retrieved from the storage system (block 820). The number of counter matrices in the time series set of counter matrices may depend on the frequency with which the counter matrices are created (block 810) and the depth of the LSTM used to implement the learning model 270. The time series set of counter matrices are labeled with the error type (block 825) and the labeled time series set of counter matrices are used as a training example for the machine learning model 270 (block 830).

The labeled time series set of counter matrices are input to the learning model 270 as a training example to train the learning model to learn a set of recursions between the time series sets of counters as the independent variables, and the error types as dependent variables (block 835). In some embodiments, the learning model is a deep learning model such as a Long Short-Term Memory (LSTM) learning model.

Once the learning model 270 is trained, a checkpoint of the trained model is deployed as an inference model 235 (block 840). In some embodiments, the learning model continues to be trained (block 845). For example, as errors occur on the set of deployed storage systems (block 815), the errors can be used to create additional labeled training examples (block 830) that can be used to continue training the learning model 270 after a checkpoint of the learning model has been deployed as the inference model 235.

Similarly, as the inference model generates proactive service requests, the proactive service requests can be labeled by the customer service representatives and those labels can be used as feedback to the learning model to continue training the learning model 270 (block 845). Periodically, the inference model 235 is updated by creating a new checkpoint of the current learning model 270 (block 850).

Figure 9:
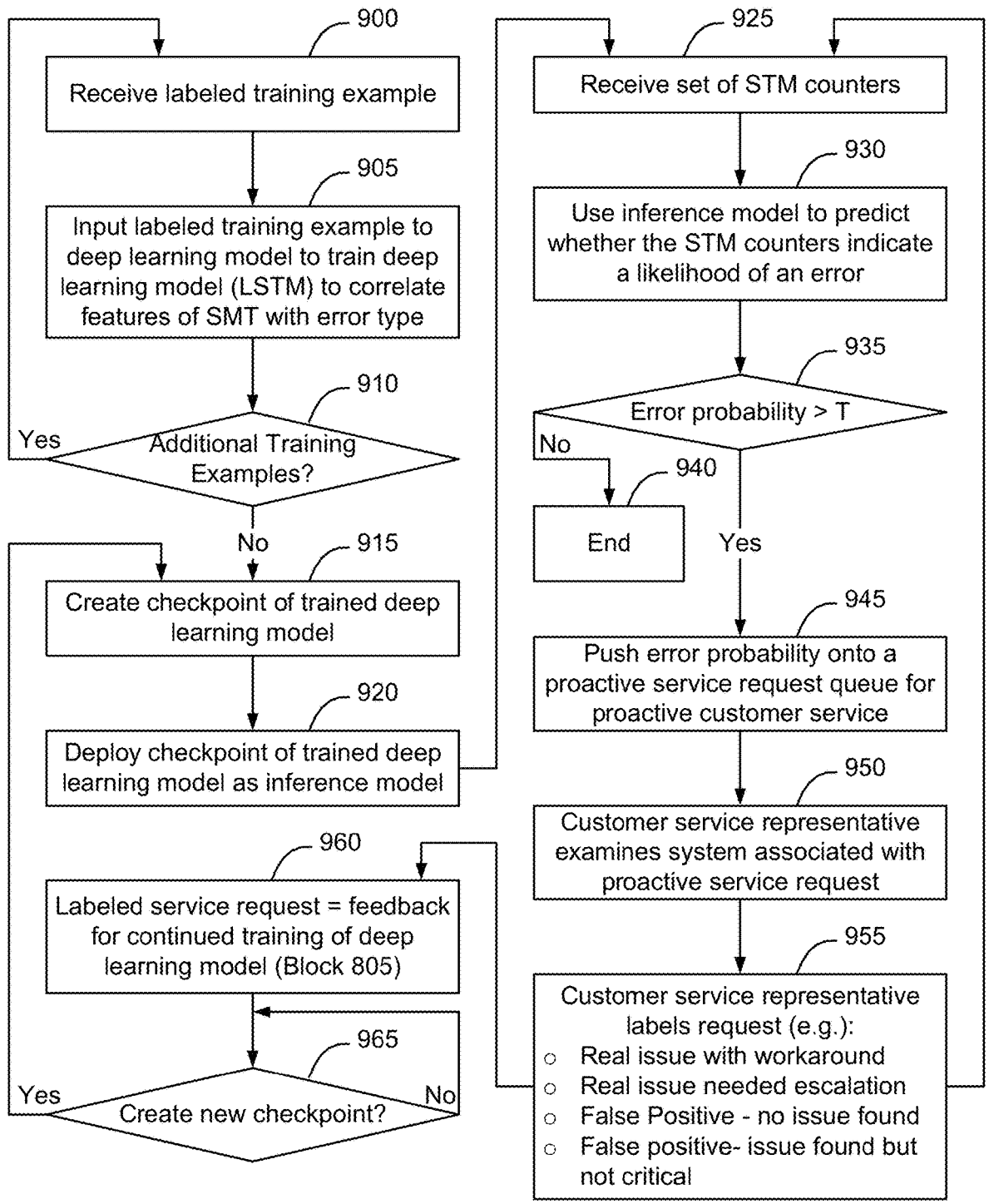
FIG. 9 is flow chart of an example process of training a learning model to forecast storage system failures and using a checkpoint of the trained learning model as an inference model to generate proactive service requests, according to some embodiments.

FIG. 9 is flow chart of an example process of training a learning model to forecast storage system failures, and using the trained learning model to generate proactive service requests, according to some embodiments. As shown in FIG. 9, in some embodiments labeled training examples are received (block 900) and the labeled training examples are used as training input to train the learning model 270 to correlate features of the time series set of counter matrices with the labeled error type (block 905). For example, error type 0x34 might always be associated with a time series set of counter matrices that show increasing SMT counter values for SMT counters #8849, #8850, and #8851. By applying multiple training examples for error type 0x34 to the learning model 270, the learning model 270 can be trained to associate increasing SMT counter values for SMT counters #8849, #8850, and #8851 with error type 0x34.

During the training process, a determination is made if there are additional training examples (block 910). When there are additional training examples (a determination of YES at block 910) the process returns to block 900 to select the next training example. When there are no additional training examples, or when a determination is made that the learning model 270 is sufficiently trained to be used as an inference model (either determination resulting in a determination of NO at block 910), a checkpoint of the learning model is created (block 915) and deployed as the inference model 235 (block 920).

In some embodiments, the inference model is deployed locally on each storage system to be used on the storage system to monitor STM counters on the storage system to create proactive service requests that are then sent by the storage system via the dial-home system 215. In other embodiments, the inference model is deployed centrally and the STM counters from the storage systems are sent to the centrally deployed inference model to enable the inference model to remotely monitor the STM counters of each of the storage systems and generate proactive service requests. Regardless of where the inference model is deployed, in some embodiments, each time a STM counter matrix is created (block 810) the STM counter matrix is provided to the inference model (block 925), and the inference model is used to predict whether the current STM counter matrix, and the previous several sets of STM counter matrices, forms a time series set of STM counter matrices that corresponds to a possible known error type (block 930).

In some embodiments, the inference model 235 is used to predict both an error type and an error probability. When an error is predicted, the error probability is compared with an error reporting threshold T (block 935). An example error reporting threshold T might be equal to 70%, although the particular threshold selected will depend on the implementation. When the error probability output by the inference model 235 is below the error reporting threshold T (a determination of NO at block 935), a proactive service request is not generated (block 940). When the error probability output by the inference model 235 is at or above the error reporting threshold T (a determination of YES at block 935), a proactive service request is generated and placed in the proactive service request queue (block 945).

Proactive service requests that are placed in the proactive service request queue are examined by customer service representatives (block 950). For example, a customer service representative might examine the system associated with the proactive service request to determine whether the system is operating correctly, or if there is corrective action that might be taken to avoid continued operation of the system in its current state that could lead to the predicted failure. In connection with handling the proactive service request, in some embodiments the customer service representative is prompted to label the request to enable feedback to be provided to the learning model 270 (block 955). Example labels might be, for example, that the proactive service request was associated with a "real issue with a workaround", a "real issue that needed escalation", a "false positive—no issue found", or a "false positive—issue found but not critical". These labels can be numerically translated into positive and negative values when applied to the learning model 270 (block 960). For example, when the proactive service request was determined to be a real issue, the feedback to the learning model can be used to strengthen the association between particular features of the time series set of STM counter matrices and the predicted error that resulted in generation of the proactive service request. Likewise, when the proactive service request was determined to be a false positive, the feedback to the learning model can be used to weaken the association between particular features of the time series set of STM counter matrices and the predicted error that resulted in generation of the proactive service request. Occasionally, as the learning model 270 continues to be trained, a new checkpoint of the learning model can be created and used to update the inference model(s) 235 (block 965).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of forecasting storage system failures and generating proactive service requests, comprising:
    creating a set of training examples for a machine learning process, each training example including a time series set of Streaming Machine Telemetry (SMT) event counters generated by software executing on a storage system during a set of SMT monitoring intervals preceding an error of the software, each training example also including a label identifying a type of error associated with the time series set of SMT event counters;
    providing the set of training examples to the machine learning process to train the machine learning process to learn recursions between the time series sets of SMT event counters as independent variables and the error types as dependent variables;
    deploying a checkpoint of the machine learning process as an inference model;
    supplying a current time series set of SMT event counters from monitored software of a storage system to the inference model; and
    predicting, by the inference model, a predicted occurrence of an error on the monitored software of the storage system before the error occurs.

2. The method of claim 1, wherein the SMT event counters are implemented as instructions embedded within sequences of operational instructions forming code paths of the monitored software.

3. The method of claim 2, wherein at least some of the code paths are associated with branches of the monitored software that execute in connection with events that are associated with software failures.

4. The method of claim 1, wherein the machine learning process is a long short-term memory implementation of a recurrent neural network.

5. The method of claim 1, wherein the step of deploying the checkpoint of the machine learning process is implemented locally on each of a plurality of monitored storage systems, each monitored storage system having a dial-home system, and wherein the step of predicting occurrence of the error comprises generating a dial-home message containing a proactive service request by the dial-home system.

6. The method of claim 1, further comprising logging a proactive service request based on the predicted occurrence of an error into a proactive service request queue;

receiving feedback related to the proactive service request; and using the feedback related to the proactive service request as further training input to the machine learning process.

7. The method of claim 6, wherein the proactive service request includes a storage system ID, an error type, and an error probability associated with the predicted error.

8. The method of claim 1, wherein the error types are a plurality of critical storage system failures, the plurality of critical storage system failures being a subset of all possible storage system failures.

9. The method of claim 1, wherein the step of training the machine learning process to learn recursions between the time series sets of SMT event counters as independent variables and the error types as dependent variables further comprises training the machine learning process to identify a respective subset of relevant SMT event counters associated with each error type.

10. The method of claim 9, wherein the respective subset of relevant SMT event counters is determined by identifying the subset of relevant SMT event counters that show an increase in the time series set of SMT event counters preceding the error.

11. A method of forecasting storage system failures and generating proactive service requests, comprising:

deploying a checkpoint of a trained machine learning process as an inference model, the machine learning process being trained to learn recursions between time series sets of Streaming Machine Telemetry (SMT) event counters as independent variables and error types as dependent variables using a set of labeled training examples, each labeled training example including a time series set of SMT event counters generated by software executing on a storage system during a set of SMT monitoring intervals preceding an error of the software, each training example also including a label identifying a type of error associated with the time series set of SMT event counters;

supplying a current time series set of SMT event counters from monitored software of a storage system to the inference model; and predicting, by the inference model, a predicted occurrence of an error on the monitored software of the storage system before the error occurs.

12. The method of claim 11, wherein the SMT event counters are implemented as instructions embedded within sequences of operational instructions forming code paths of the monitored software.

13. The method of claim 12, wherein at least some of the code paths are associated with branches of the monitored software that execute in connection with events that are associated with software failures.

14. The method of claim 11, wherein the machine learning process is a long short-term memory implementation of a recurrent neural network.

15. The method of claim 11, wherein the step of deploying the checkpoint of the machine learning process is implemented locally on each of a plurality of monitored storage systems, each monitored storage system having a dial-home system, and wherein the step of predicting occurrence of the error comprises generating a dial-home message containing a proactive service request by the dial-home system.

16. The method of claim 11, further comprising logging a proactive service request based on the predicted occurrence of an error into a proactive service request queue;

receiving feedback related to the proactive service request; and using the feedback related to the proactive service request as further training input to the machine learning process.

17. The method of claim 16, wherein the proactive service request includes a storage system ID, an error type, and an error probability associated with the predicted error.

18. The method of claim 11, wherein the error types are a plurality of critical storage system failures, the plurality of critical storage system failures being a subset of all possible storage system failures.

19. The method of claim 11, wherein the machine learning process is further trained to identify a respective subset of relevant SMT event counters associated with each error type.

20. The method of claim 19, wherein the respective subset of relevant SMT event counters is a subset of relevant SMT event counters that show an increase in the time series set of SMT event counters preceding the error.

* * * * *